(12) United States Patent
Reinhardt et al.

(10) Patent No.: US 7,444,497 B2
(45) Date of Patent: Oct. 28, 2008

(54) MANAGING EXTERNAL MEMORY UPDATES FOR FAULT DETECTION IN REDUNDANT MULTITHREADING SYSTEMS USING SPECULATIVE MEMORY SUPPORT

(75) Inventors: Steven K. Reinhardt, Vancouver, WA (US); Shubhendu S. Mukherjee, Framingham, MA (US); Joel S. Emer, Acton, MA (US); Christopher T. Weaver, Marlboro, MA (US)

(73) Assignee: Intel Corporation, Santa Clara, CA (US)

( * ) Notice: Subject to any disclaimer, the term of this patent is extended or adjusted under 35 U.S.C. 154(b) by 416 days.

(21) Appl. No.: 10/750,039

(22) Filed: Dec. 30, 2003

(65) Prior Publication Data

US 2005/0154944 A1 Jul. 14, 2005

(51) Int. Cl.
*G06F 9/30* (2006.01)
(52) U.S. Cl. ...................................... 712/218
(58) Field of Classification Search ................ 712/218, 712/216; 714/718
See application file for complete search history.

(56) References Cited

U.S. PATENT DOCUMENTS

| | | | |
|---|---|---|---|
| 5,415,835 A | 5/1995 | Brueck | |
| 6,304,318 B1 | 10/2001 | Matsumoto | |
| 6,625,749 B1 * | 9/2003 | Quach | 714/10 |
| 2002/0023202 A1 | 2/2002 | Mukherjee | |

FOREIGN PATENT DOCUMENTS

EP 0915384 A2 12/1999

OTHER PUBLICATIONS

"Transient-Fault Recovery Using Simultaneous Multithreading"; Vijaykumar et al.; IEEE; 2002.*
"Slipstream Processors: Improving both Performance and Fault Tolerance"; Sundaramoorthy et al.; ACM; 2000.*
"Transient-Fault Recovery for Chip Multiprocessors"; Gomaa et al.; IEEE; 2003.*
European Patent Office, International Search Report and Written Opinion for International Patent Application No. PCT/US2004/043649, 10 pages, Mar. 24, 2006.

* cited by examiner

*Primary Examiner*—Tonia L. M. Dollinger
*Assistant Examiner*—Benjamin Geib
(74) *Attorney, Agent, or Firm*—Derek J. Reynolds

(57) ABSTRACT

A multithreaded architecture is disclosed for managing external memory updates for fault detection in redundant multithreading systems using speculative memory support. In particular, a method provides input replication of load values on a SRT processor by using speculative memory support to isolate redundant threads form external updates. This method thus avoids the need for dedicated structures to provide input replication.

17 Claims, 5 Drawing Sheets

US 7,444,497 B2

MANAGING EXTERNAL MEMORY UPDATES FOR FAULT DETECTION IN REDUNDANT MULTITHREADING SYSTEMS USING SPECULATIVE MEMORY SUPPORT

RELATED APPLICATION

This U.S. patent application is related to the following U.S. patent application:
(1) BUFFERING UNCHECKED STORES FOR FAULT DETECTION IN RMS USING SPECULATIVE MEMORY SUPPORT, application No. (Attorney Docket No. P17412), filed Dec. 30, 2003.

BACKGROUND INFORMATION

Processors are becoming increasingly vulnerable to transient faults caused by alpha particle and cosmic ray strikes. These faults may lead to operational errors referred to as "soft" errors because these errors do not result in permanent malfunction of the processor. Strikes by cosmic ray particles, such as neutrons, are particularly critical because of the absence of practical protection for the processor. Transient faults currently account for over 90% of faults in processor-based devices.

As transistors shrink in size the individual transistors become less vulnerable to cosmic ray strikes. However, decreasing voltage levels the accompany the decreasing transistor size and the corresponding increase in transistor count for the processor results in an exponential increase in overall processor susceptibility to cosmic ray strikes or other causes of soft errors. To compound the problem, achieving a selected failure rate for a multi-processor system requires an even lower failure rate for the individual processors. As a result of these trends, fault detection and recovery techniques, typically reserved for mission-critical applications, are becoming increasing applicable to other processor applications.

Silent Data Corruption (SDC) occurs when errors are not detected and may result in corrupted data values that can persist until the processor is reset. The SDC Rate is the rate at which SDC events occur. Soft errors are errors that are detected, for example, by using parity checking, but cannot be corrected.

Fault detection support can reduce a processor's SDC rate by halting computation before faults can propagate to permanent storage. Parity, for example, is a well-known fault detection mechanism that avoids silent data corruption for single-bit errors in memory structures. Unfortunately, adding parity to latches or logic in high-performance processors can adversely affect the cycle time and overall performance. Consequently, processor designers have resorted to redundant execution mechanisms to detect faults in processors.

Current redundant-execution systems commonly employ a technique known as "lockstepping" that detects processor faults by running identical copies of the same program on two identical lockstepped (cycle-synchronized) processors. In each cycle, both processors are fed identical inputs and a checker circuit compares the outputs. On an output mismatch, the checker flags an error and can initiate a recovery sequence. Lockstepping can reduce processors SDC FIT by detecting each fault that manifests at the checker. Unfortunately, lockstepping wastes processor resources that could otherwise be used to improve performance.

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the inventions.

DETAILED DESCRIPTION

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well-known devices, circuits, and methods are omitted so as not to obscure the description of the present invention with unnecessary detail.

Sphere of Replication

Figure 1:
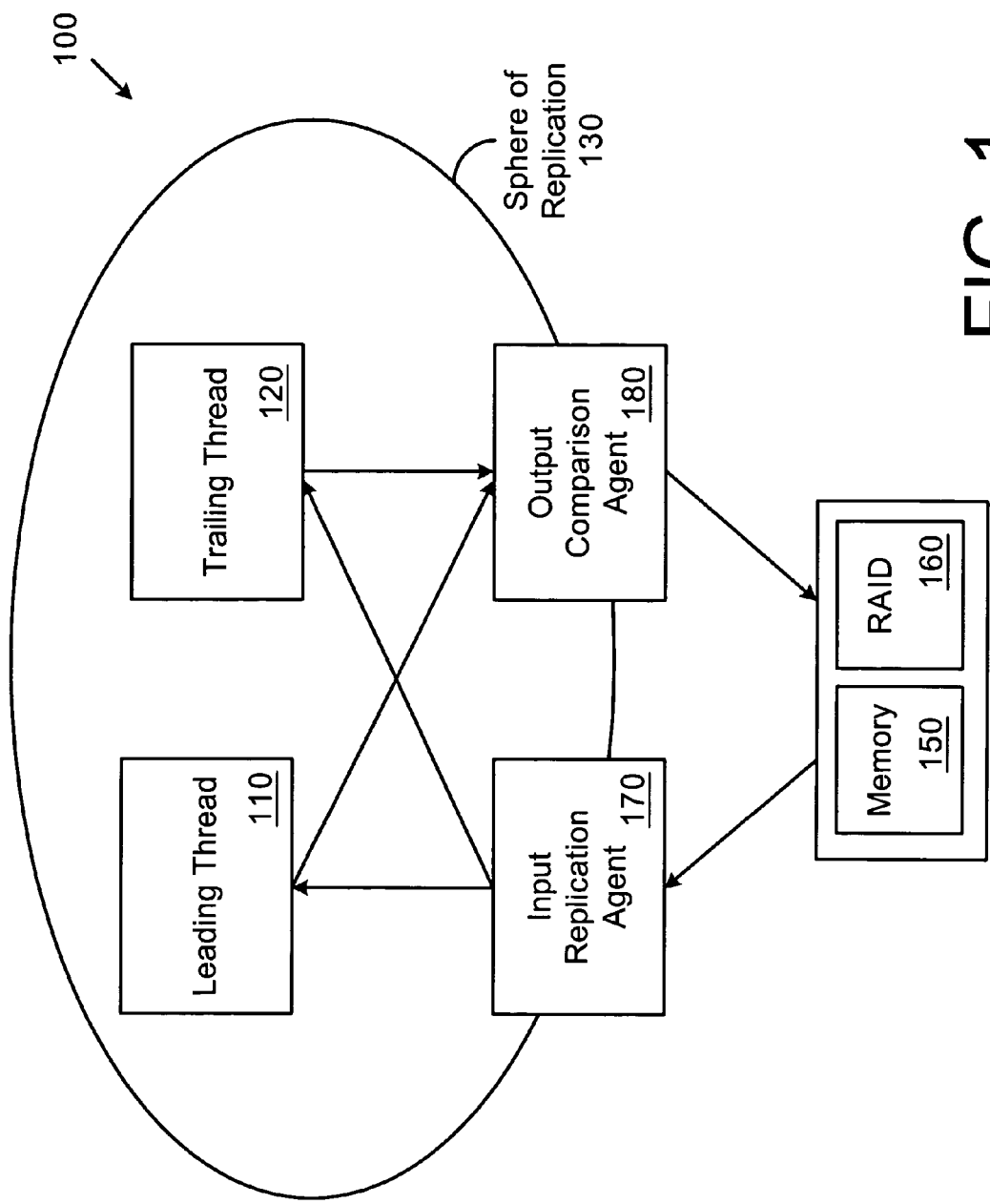
FIG. 1 is a block diagram of one embodiment of a redundantly multithreaded architecture with the redundant threads.

FIG. 1 is a block diagram of one embodiment of a redundantly multithreaded architecture. In a redundantly multithreaded architecture faults can be detected by executing two copies of a program as separate threads. Each thread is provided with identical inputs and the outputs are compared to determined whether an error has occurred. Redundant multithreading can be described with respect to a concept referred to herein as the "sphere of replication." The sphere of replication is the boundary of logically or physically redundant operation.

Components within sphere of replication 130 (e.g., a processor executing leading thread 110 and a processor executing trailing thread 120) are subject to redundant execution. In contrast, components outside sphere of replication 130 (e.g., memory 150, RAID 160) are not subject to redundant execution. Fault protection is provide by other techniques, for example, error correcting code for memory 150 and parity for RAID 160. Other devices can be outside of sphere of replication 130 and/or other techniques can be used to provide fault protection for devices outside of sphere of replication 130.

Data entering sphere of replication 130 enter through input replication agent 170 that replicates the data and sends a copy of the data to leading thread 110 and to trailing thread 120. Similarly, data exiting sphere of replication 130 exit through output comparison agent 180 that compares the data and determines whether an error has occurred. Varying the boundary of sphere of replication 130 results in a performance versus amount of hardware tradeoff. For example, replicating memory 150 would allow faster access to memory by avoiding output comparison of store instructions, but would increase system cost by doubling the amount of memory in the system.

In general, there are two spheres of replication, which can be referred to as "SoR-register" and "SoR-cache." In the SoR-register architecture, the register file and caches are outside the sphere of replication. Outputs from the SoR-register sphere of replication include register writes and store address and data, which are compared for faults. In the SoR-cache architecture, the instruction and data caches are outside the sphere of replication, so all store addresses and data, but not register writes, are compared for faults.

The SoR-cache architecture has the advantage that only stores (and possibly a limited number of other selected instructions) are compared for faults, which reduces checker bandwidth and improves performance by not delaying the store operations. In contrast, the SoR-register-architecture requires comparing most instructions for faults, which requires greater checker bandwidth and can delay store operations until the checker determines that all instructions prior to the store operation are fault-free. The SoR-cache can provide the same level of transient fault coverage as SoR-register because faults that do not manifest as errors at the boundary of the sphere of replication do not corrupt the system state, and therefore, are effectively masked.

In order to provide fault recovery, each instruction result should be compared to provide a checkpoint corresponding to every instruction. Accordingly, the SoR-register architecture is described in greater detail herein.

Overview of Simultaneous and Redundantly Threaded Architecture

Figure 2:
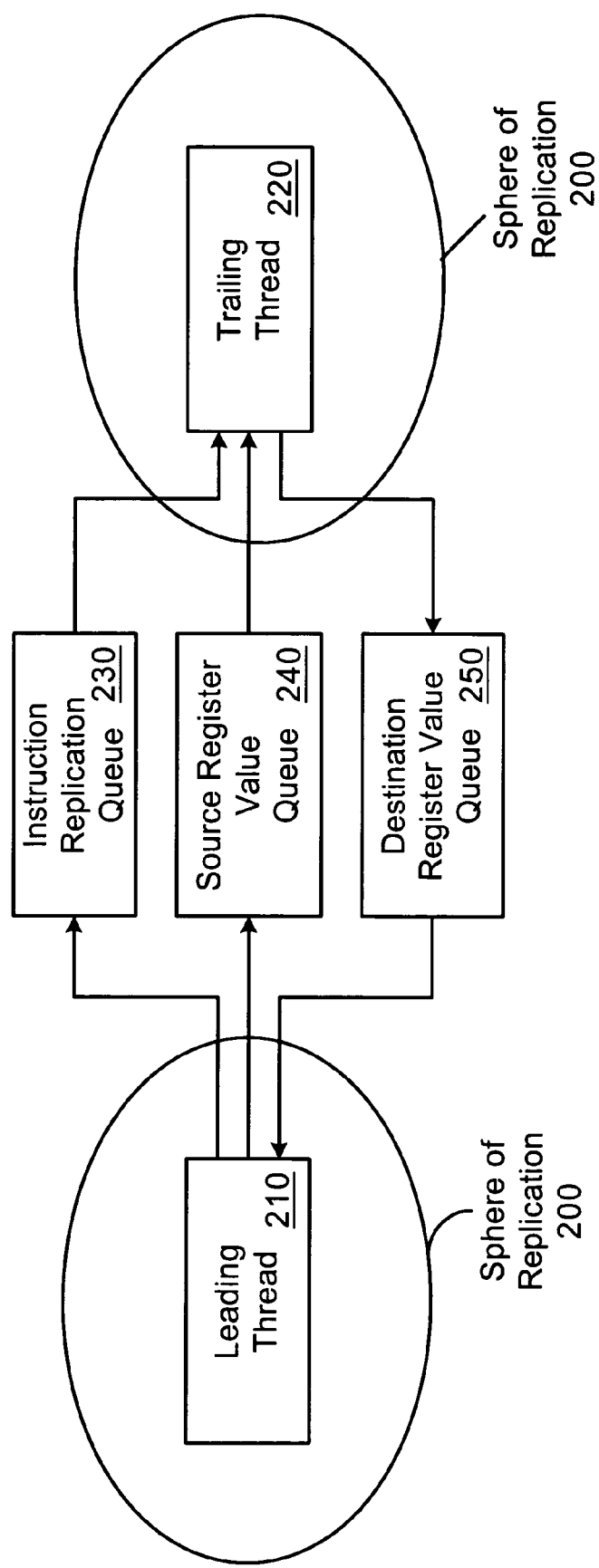
FIG. 2 is a block diagram of one embodiment of a simultaneous and redundantly threaded architecture.

FIG. 2 is a block diagram of one embodiment of a simultaneous and redundantly threaded architecture. The architecture of FIG. 2 is a SoR-register architecture in which the output, or result, from each instruction is compared to detect errors.

Leading thread 210 and trailing thread 220 represent corresponding threads that are executed with a time differential so that leading thread 210 executes instructions before trailing thread 220 executes the same instruction. In one embodiment, leading thread 210 and trailing thread 220 are identical. Alternatively, leading thread 210 and/or trailing thread 220 can include control or other information that is not included in the counterpart thread. Leading thread 210 and trailing thread 220 can be executed by the same processor or leading-thread 210 and trailing thread 220 can be executed by different processors.

Instruction addresses are passed from leading thread 210 to trailing thread 220 via instruction replication queue 230. Passing the instructions through instruction replication queue 230 allows control over the time differential or "slack" between execution of an instruction in leading thread 210 and execution of the same instruction in trailing thread 220.

Input data are passed from leading thread 210 to trailing thread 220 through source register value queue 240. In one embodiment, source register value queue 240 replicates input data for both leading thread 210 and trailing thread 220. Output data are passed from trailing thread 220 to leading thread 210 through destination register value queue 250. In one embodiment, destination register value queue 240 compares output data from both leading thread 210 and trailing thread 220.

In one embodiment, leading thread 210 runs hundreds of instructions ahead of trailing thread 220. Any number of instructions of "slack" can be used. In one embodiment, the slack is caused by slowing and/or delaying the instruction fetch of trailing thread 220. In an alternate embodiment, the slack can be caused by instruction replication queue 230 or an instruction replication mechanism, if instruction replication is not performed by instruction replication queue 230.

Further details for techniques for causing slack in a simultaneous and redundantly threaded architecture can be found in "Detailed Design and Evaluation of Redundant Multithreading Alternatives," by Shubhendu S. Mukherjee, Michael Kontz and Steven K. Reinhardt in Proc. 29$^{th}$ Int'l Symp. on Computer Architecture, May 2002 and in "Transient Fault Detection via Simultaneous Multithreading," by Steven K. Reinhardt and Shubhendu S. Mukherjee, in Proc. 27$^{th}$ Int'l Symp. on Computer Architecture, June 2000.

Figure 3:
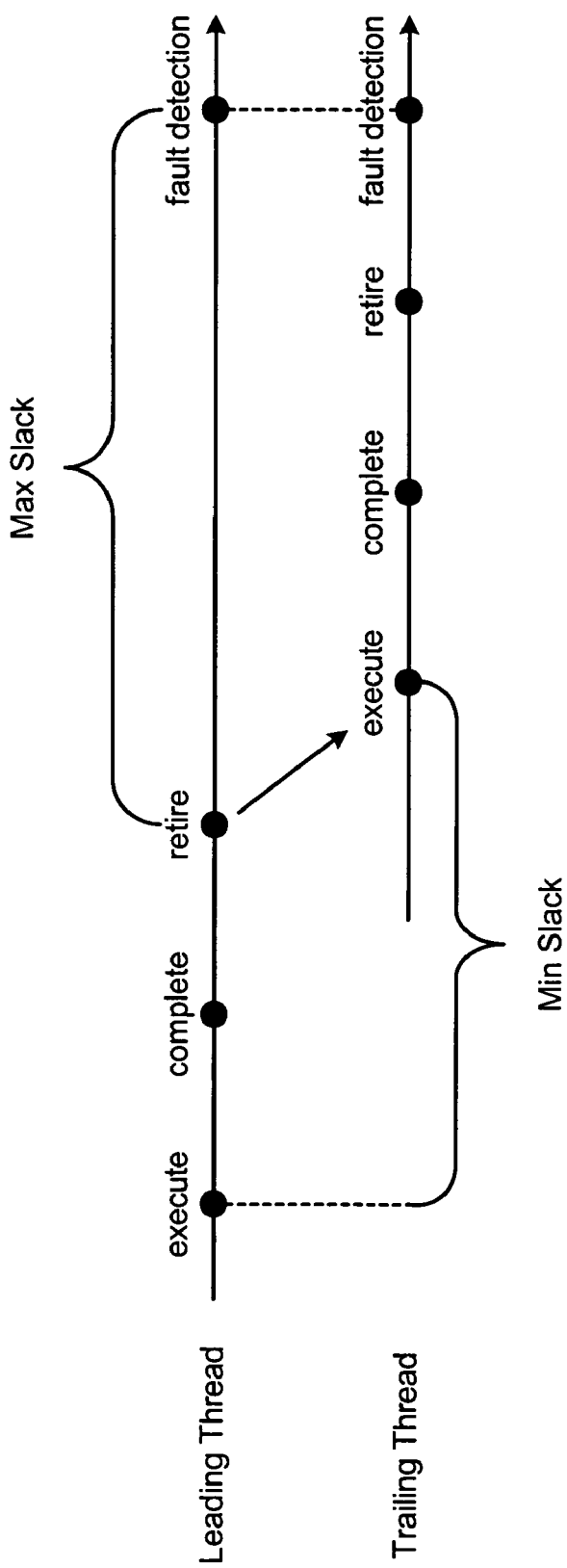
FIG. 3 illustrates minimum and maximum slack relationships for one embodiment of a simultaneous and redundantly multithreaded architecture.

FIG. 3 illustrates minimum and maximum slack relationships for one embodiment of a simultaneous and redundantly threaded architecture. The embodiment of FIG. 3 is a SoR-register architecture as described above. The minimum slack is the total latency of a cache miss, latency from execute to retire, and latency incurred to forward the load address and value to the trailing thread. If the leading thread suffers a cache miss and the corresponding load from the trailing thread arrives at the execution point before the minimum slack, the trailing thread is stalled.

Similarly, the maximum slack is latency from retire to fault detection in the leading thread. In general, there is a certain amount of buffering to allow retired instructions from the leading thread to remain in the processor after retirement. This defines the maximum slack between the leading and trailing threads. If the buffer fills, the leading thread is stalled to allow the trailing thread to consume additional instructions from the buffer. Thus, if the slack between the two threads is greater than the maximum slack, the overall performance is degraded.

Speculative Memory Support

In a speculative multithreading system, a sequential program is divided into logically sequential segments, referred to as epochs or tasks. Multiple epochs are executed in parallel, either on separate processor cores or as separate threads within an SMT processor. At any given point in time, only the oldest epoch corresponds to the execution of the original sequential program. The execution of all other epochs is based on speculating past potential control and data hazards. In the case of an inter-epoch misspeculation, the misspeculated epochs are squashed. If an epoch completes execution and becomes the oldest epoch, its results are committed to the sequential architectural state of the computation.

In one embodiment of a speculative multithreading system, the compiler may partition the code statically into epochs based on heuristics. For example, loop bodies may often be used to form epochs. In this case, multiple iterations of the loop would create multiple epochs at runtime that would be executed in parallel.

The system must enforce inter-epoch data hazards to maintain the sequential program's semantics across this parallel execution. In one embodiment, the compiler is responsible for epoch formation, so it can manage register-based inter-epoch communication explicitly (perhaps with hardware support). Memory-based data hazards are not (in general) statically predictable, and thus must be handled at runtime. Memory-system extensions to manage inter-epoch memory data dependences, satisfying them when possible, and detecting violations and squashing epochs otherwise, are a key component of any speculative multithreading system.

Figure 4:
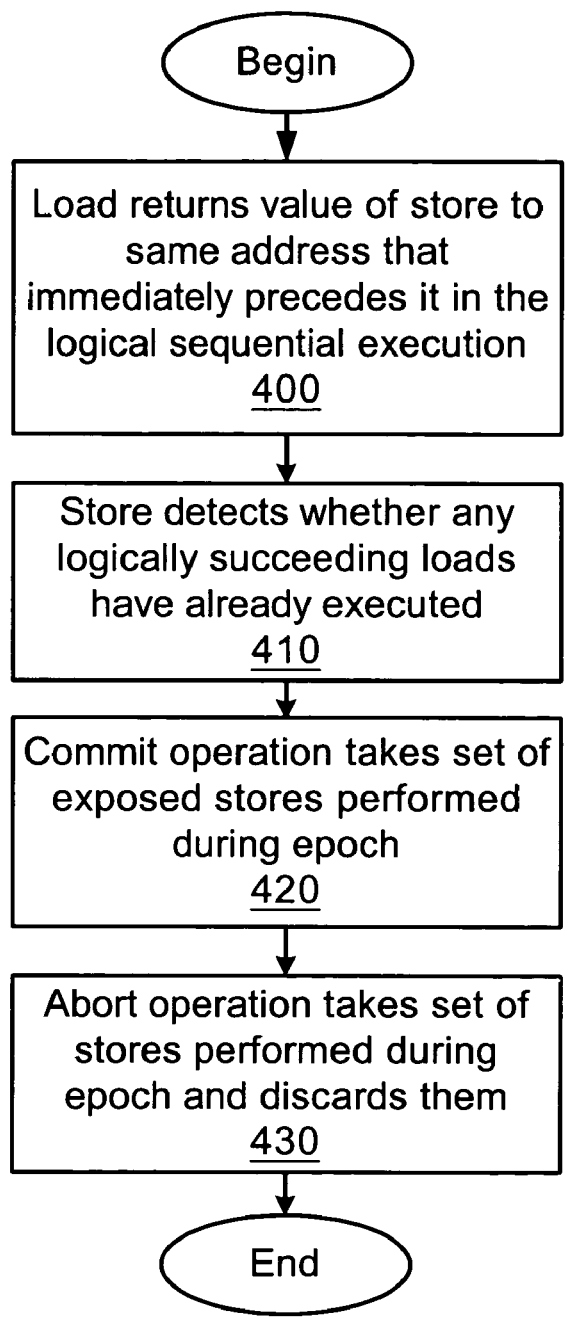
FIG. 4 is a flow diagram of memory system extensions to manage inter-epoch memory data dependencies.

FIG. 4 illustrates memory system extensions to manage inter-epoch memory data dependences. Detecting violations and squashing epochs are an important feature of any speculative multithreading system. In one embodiment, a load must return the value of a store to the same address that immediately precedes it in a program's logical sequential execution, step 400. For example, the system must return in priority order the following. First, the value from the most recent prior store within the same epoch, if any. Second, the value from the latest store in the closest logically preceding epoch, if any. Finally, the value from the committed sequential memory state. Furthermore, the load must not be affected by any logically succeeding stores that have already been executed. This is assuming that the processor guarantees that memory references appear to execute sequentially within an epoch, so therefore, any logically succeeding stores will belong to logically succeeding epochs.

Next, a store must detect whether any logically succeeding loads have already executed, 410. If they have, they are violating the data dependence. Any epoch containing such a load, and potentially any later epoch as well, must then be squashed. A commit operation takes the set of exposed stores performed during an epoch and applies them atomically to the committed sequential memory state, 420. An exposed store is the last store to a particular location within an epoch. Non-exposed stores, i.e., those whose values are overwritten within the same epoch, are not observable outside of the epoch in which they execute. Finally, an abort operation takes the set of stores performed during an epoch and discards them, 430.

Figure 5:
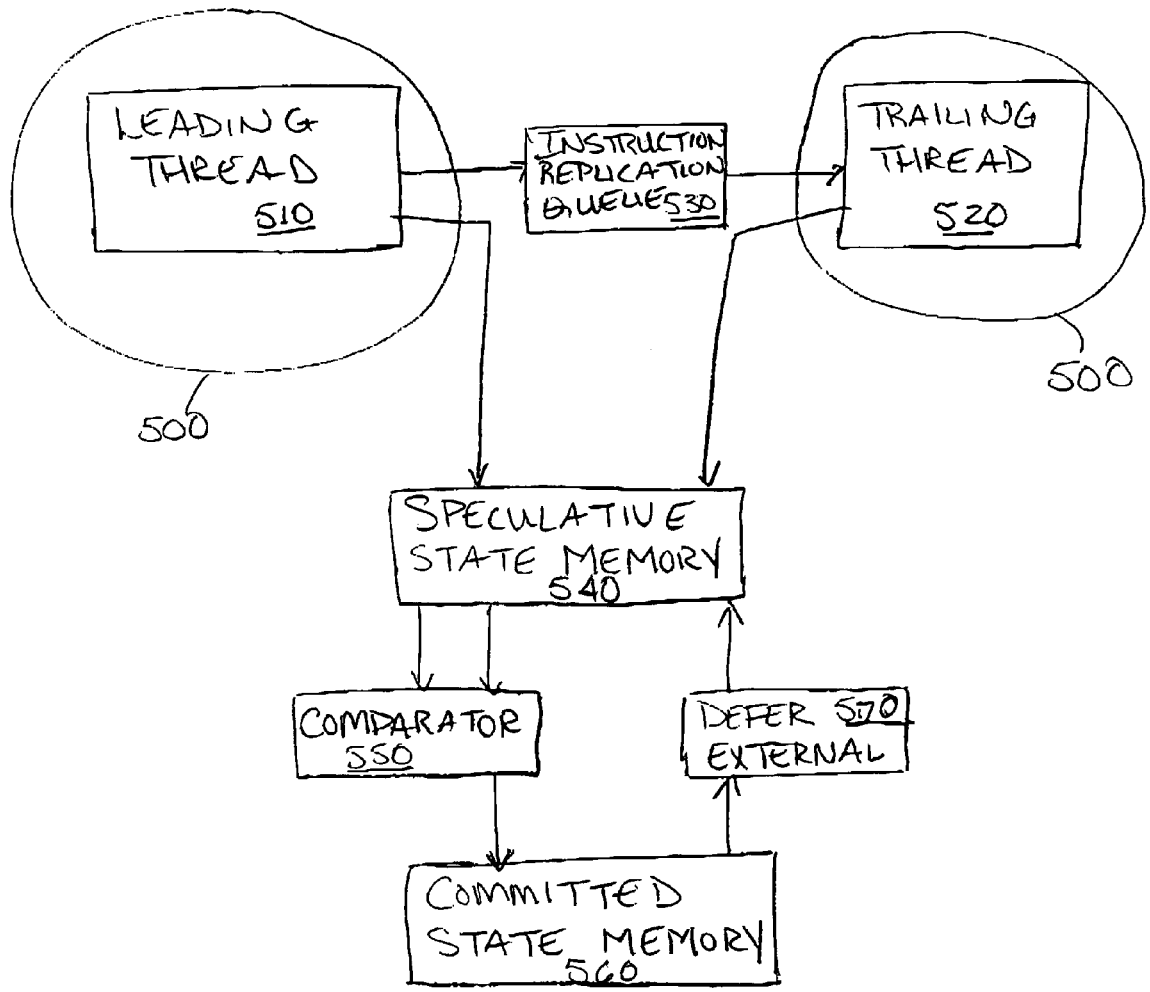
FIG. 5 is a block diagram of one embodiment of external memory updates for fault detection in a redundant multithreading architecture.

FIG. 5 is a block diagram of isolating redundant executions from external memory updates for fault detection in redundant multithreading systems using speculative memory support. By isolating executions from external memory updates provides precise replication of load inputs.

In this embodiment, leading thread 510 and trailing thread 520 execute epochs in parallel. An instruction replication queue 530 sends the epoch from the leading thread 510 to the trailing thread 520. Both the leading thread 510 and the trailing thread 520 have a sphere of replication 500.

Individual executions of a particular epoch is known as an epoch "instance". The two instances of epoch are executed in parallel by the leading thread 510 and the trailing thread 520 of the RMT system. Once executed, the stores are sent to a memory system 540. Memory modifications from external agents that may modify locations already accessed during the current epoch are not applied. Rather, they are placed in memory 540. Since they are placed in memory, any locations read by the leading thread during the epoch will have the same value when the corresponding trailing thread load occurs. The stores are kept in the memory system as speculative stores, using the speculative memory support described above. Once both instances of the epoch have been completed, the exposed stores are compared 550. If the compared stores match, a single set of exposed stores is committed to the architectural memory state 560.

In this embodiment, the condition being detected, as described above, is an external write to a location that has been read within a currently executing epoch. In speculative memory systems, an occurrence of this condition would indicate an incorrect speculation and cause the currently executing epoch to be squashed. Squashing both instances of the current epoch in a RMT system would likewise avoid divergent execution, and represent an adequate solution as long as forward progress can be guaranteed. However, in a RMT system with a relaxed memory consistency model, this event need not cause a squash. If the prior value of the externally written location can be maintained until the end of the epoch, and supplied to any subsequent loads within both epoch instances, then both instances will continue along the same execution path. The external write can be made visible to the local threads at the completion of the current epoch, 570.

The conflicting access detection mechanism of a speculative memory system may identify a superset of the events that could cause divergent execution in a RMT system. Specifically, there may be three distinct situations in which an external write occurs to a location within a block that has been read locally during the current epoch, all of which would be flagged by the speculative memory system.

In the first situation, the externally written location, while within the same cache block, is distinct from the location(s) read by the local processor. In this case, the speculative memory system indicates a "false conflict". This situation can be avoided by using additional state bits to indicate precisely which words within the block have been accessed.

In a second situation, the external write occurs after both the leading and trailing threads have completed their corresponding accesses (but before the end of the epoch). The two redundant threads have already retrieved the same value, so no divergence will occur.

In a third situation, the external write occurs after one thread completes its access, but before the other thread has completed its corresponding access. In this case only, applying the external write at the time of its arrival may cause divergent execution.

Advantageously, if detected access conflicts cause the current epoch to be squashed, then distinguishing the first two cases from the third may be worthwhile to avoid discarding work needlessly. If conflicting external writes are merely deferred until an epoch boundary, then the penalty for applying that policy for all the cases should be minimal.

Another advantage of the speculative memory approach relative to the original LVQ design is that the memory system is accessed twice, bringing the cache access path into the sphere of replication and extending RMT's fault coverage. However, this benefit comes at the cost of increasing memory system bandwidth requirements.

In addition, the current speculative memory approach groups all loads within an epoch together. Forcing external invalidations to take effect only between epochs guarantees that both instances of every load within the preceding epoch have completed, and neither instance of any load within the succeeding epoch has occurred.

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well-known devices, circuits, and methods are omitted so as not to obscure the description of the present invention with unnecessary detail.

What is claimed is:

1. A method comprising:
   executing corresponding instruction threads in parallel as a leading thread and a trailing thread;
   speculatively saving a result from a first instruction executed in the leading thread and speculatively saving a result from a second instruction corresponding to the first instruction executed in the trailing thread to a memory having extensions for speculative storage;
   comparing the results saved in the memory;
   committing a single set of instructions based on the compared result; and deferring updates from one or more external agents to one or more memory locations accessed by the instruction threads until the single set of instructions has been committed.

2. The method of claim 1, wherein the corresponding instruction threads are epoch instruction threads.

3. The method of claim 2, wherein a location read by the leading thread during an epoch contains same value as that read by the leading thread when the corresponding read by the trailing thread load occurs.

4. An apparatus comprising:
a means for executing parallel threads as a leading thread and a trailing thread;
a means for speculatively saving the results from the executed threads in a memory having extensions for speculative storage;
a means for comparing the results saved in the memory;
a means for committing a single set of instructions based on the compared result; and
a means for deferring one or more updates from one or more external agents to one or more memory locations accessed by the parallel threads until the single set of instructions has been committed.

5. The apparatus of claim 4 wherein the parallel threads each execute an instance of an epoch.

6. The apparatus of claim 4, wherein each of the one or more updates is a write from one of the one or more external agents to at least one of the one or more memory locations accessed by the parallel threads.

7. The apparatus of claim 4 wherein a location having a first value when loaded by the leading thread during an epoch contains the first value with the corresponding load by trailing thread loads occurs.

8. The apparatus of claim 7 wherein the single set is committed if the compare result matches.

9. An apparatus comprising:
a thread execution logic to:
execute parallel threads as a leading thread and a trailing thread;
speculatively save the results from the executed threads in a memory having extensions for speculative storage;
compare the results saved in the memory; and
commit a single set of instructions based on the compared result; and
a conflicting access detection mechanism to:
defer one or more updates from one or more external agents to one or more memory locations accessed by the parallel threads until the single set of instructions has been committed.

10. The apparatus of claim 9 wherein the parallel threads each execute an instance of an epoch.

11. The apparatus of claim 10, wherein each of the one or more updates is a write from one of the one or more external agents to at least one of the one or more memory locations accessed by the parallel threads.

12. The apparatus of claim 11, wherein each of the one or more writes are flagged for deferral when the write occurs to a location within a cache block that has been accessed by the parallel threads.

13. The apparatus of claim 12, wherein the conflicting access detection mechanism further is operable to:
not defer a first write from the one or more writes when the first write targets a different location within the cache block than any locations accessed by the parallel threads.

14. The apparatus of claim 12, wherein the conflicting access detection mechanism is further operable to:
not defer a first write from the one or more writes when the first write is determined to be targeting a memory location that has completed accesses from both parallel threads and a same value has been retrieved from both parallel thread accesses.

15. The apparatus of claim 12, wherein the conflicting access detection mechanism is further operable to:
defer a first write from the one or more writes when the first write is to a memory location that one of the parallel threads has completed an access to and the other of the parallel threads has not completed an access to.

16. The apparatus of claim 9 wherein a location having a first value when loaded by the leading thread during an epoch contains the first value with the corresponding load by trailing thread loads occurs.

17. The apparatus of claim 16 wherein the single set is committed if the compare result matches.

* * * * *